(12) United States Patent
Agapi et al.

(10) Patent No.: US 8,416,714 B2
(45) Date of Patent: Apr. 9, 2013

(54) MULTIMODAL TELECONFERENCING

(75) Inventors: Ciprian Agapi, Boca Raton, FL (US);
William K. Bodin, Austin, TX (US);
Charles W. Cross, Jr., Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 208 days.

(21) Appl. No.: 12/535,923

(22) Filed: Aug. 5, 2009

(65) Prior Publication Data

US 2011/0032845 A1    Feb. 10, 2011

(51) Int. Cl.
*H04L 12/16* (2006.01)
*H04L 12/18* (2006.01)

(52) U.S. Cl.
USPC .......................................................... 370/260

(58) Field of Classification Search ........... 370/259–261
See application file for complete search history.

(56) References Cited

U.S. PATENT DOCUMENTS

| | | | |
|---|---|---|---|
| 5,577,165 | A | 11/1996 | Takebayashi et al. |
| 5,584,052 | A | 12/1996 | Galau et al. |
| 6,208,972 | B1 | 3/2001 | Grant et al. |
| 6,606,599 | B2 | 8/2003 | Grant et al. |
| 6,856,960 | B1 | 2/2005 | Dragosh et al. |
| 6,920,425 | B1 | 7/2005 | Will et al. |
| 6,999,930 | B1 | 2/2006 | Roberts et al. |
| 7,035,805 | B1 | 4/2006 | Miller |
| 7,171,243 | B2 | 1/2007 | Watanabe et al. |
| 7,188,067 | B2 | 3/2007 | Grant et al. |
| 2002/0065944 | A1 | 5/2002 | Hickey et al. |
| 2002/0099553 | A1 | 7/2002 | Brittan et al. |
| 2002/0120554 | A1 | 8/2002 | Vega |

(Continued)

FOREIGN PATENT DOCUMENTS

| | | |
|---|---|---|
| CN | 1385783 | 12/2002 |
| EP | 0794670 A | 9/1997 |

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Dang T Ton
*Assistant Examiner* — Kevin Lee
(74) *Attorney, Agent, or Firm* — Delizio Gilliam, PLLC

(57) ABSTRACT

Multimodal teleconferencing including receiving, by a multimodal teleconferencing module, a speech utterance from one of a plurality of participants in the multimodal teleconference; identifying the participant making the speech utterance as a current speaker; retrieving, by the multimodal teleconferencing module from accounts for the current speaker, content for display to the current speaker; retrieving, by the multimodal teleconferencing module from accounts for the current speaker, content for display to one or more other participants in the multimodal teleconference; providing, by the multimodal teleconferencing module to a multimodal teleconferencing client for display to the current speaker, an identification of the speaker and the content retrieved for the speaker; and providing, by the multimodal teleconferencing module to one or more of multimodal teleconferencing clients for display to the other participants, an identification of the current speaker with the content retrieved for the one or more other participants in the multimodal teleconference.

21 Claims, 9 Drawing Sheets

U.S. PATENT DOCUMENTS

| | | |
|---|---|---|
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0025115 A1 | 2/2004 | Sienel et al. |
| 2004/0031058 A1 | 2/2004 | Reisman |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Farrans et al. |
| 2004/0153323 A1 | 8/2004 | Charney et al. |
| 2004/0216036 A1 | 10/2004 | Chu et al. |
| 2004/0236574 A1 | 11/2004 | Ativanichayaphong |
| 2004/0260562 A1 | 12/2004 | Kijirai |
| 2005/0075884 A1 | 4/2005 | Badt, Jr. |
| 2005/0091059 A1 | 4/2005 | Lecoeuche |
| 2005/0131701 A1 | 6/2005 | Cross |
| 2005/0138219 A1 | 6/2005 | Bou-Ghannam et al. |
| 2005/0138647 A1 | 6/2005 | Bou-ghannam et al. |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0184626 A1 | 8/2006 | Agapi |
| 2006/0190264 A1 | 8/2006 | Jaramillo |
| 2006/0218039 A1 | 9/2006 | Johnson |
| 2006/0224430 A1 | 10/2006 | Butt |
| 2006/0229880 A1 | 10/2006 | White |
| 2006/0235694 A1 | 10/2006 | Cross |
| 2007/0067852 A1* | 3/2007 | James ............... 726/28 |
| 2008/0177611 A1 | 7/2008 | Sommers et al. |
| 2009/0094233 A1 | 4/2009 | Marvit et al. |
| 2009/0204465 A1 | 8/2009 | Padhan |
| 2009/0220065 A1* | 9/2009 | Ahuja et al. ............ 379/202.01 |
| 2009/0234921 A1 | 9/2009 | Dudley |
| 2009/0287685 A1 | 11/2009 | Charnock et al. |
| 2011/0074915 A1* | 3/2011 | Ferren et al. ............... 348/14.11 |

FOREIGN PATENT DOCUMENTS

| | | |
|---|---|---|
| EP | 1450350 | 8/2004 |
| GB | 0507148.5 | 4/2005 |
| JP | 2000155529 A | 6/2000 |
| JP | 02003140672 A | 5/2003 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

Final Office Action, U.S. Appl. No. 11/154,896, May 14, 2008.
Final Office Action, U.S. Appl. No. 11/154,899, Jun. 23, 2009.
Office Action, U.S. Appl. No. 12/109,227, Dec. 10, 2010.

* cited by examiner

MULTIMODAL TELECONFERENCING

BACKGROUND OF THE INVENTION

1. Field of the Invention

The field of the invention is data processing, or, more specifically, methods, apparatus, and products for multimodal teleconferencing.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags (SALT). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Currently teleconferences allow participants to speak to one another but teleconferencing applications do not provide the visual context of the subject matter being discussed.

SUMMARY OF THE INVENTION

Multimodal teleconferencing including receiving, by a multimodal teleconferencing module, a speech utterance from one of a plurality of participants in the multimodal teleconference; identifying the participant making the speech utterance as a current speaker; retrieving, by the multimodal teleconferencing module from accounts for the current speaker, content for display to the current speaker; retrieving, by the multimodal teleconferencing module from accounts for the current speaker, content for display to one or more other participants in the multimodal teleconference; providing, by the multimodal teleconferencing module to a multimodal teleconferencing client for display to the current speaker, an identification of the speaker and the content retrieved for the speaker; and providing, by the multimodal teleconferencing module to one or more of multimodal teleconferencing clients for display to the other participants, an identification of the current speaker with the content retrieved for the one or more other participants in the multimodal teleconference.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
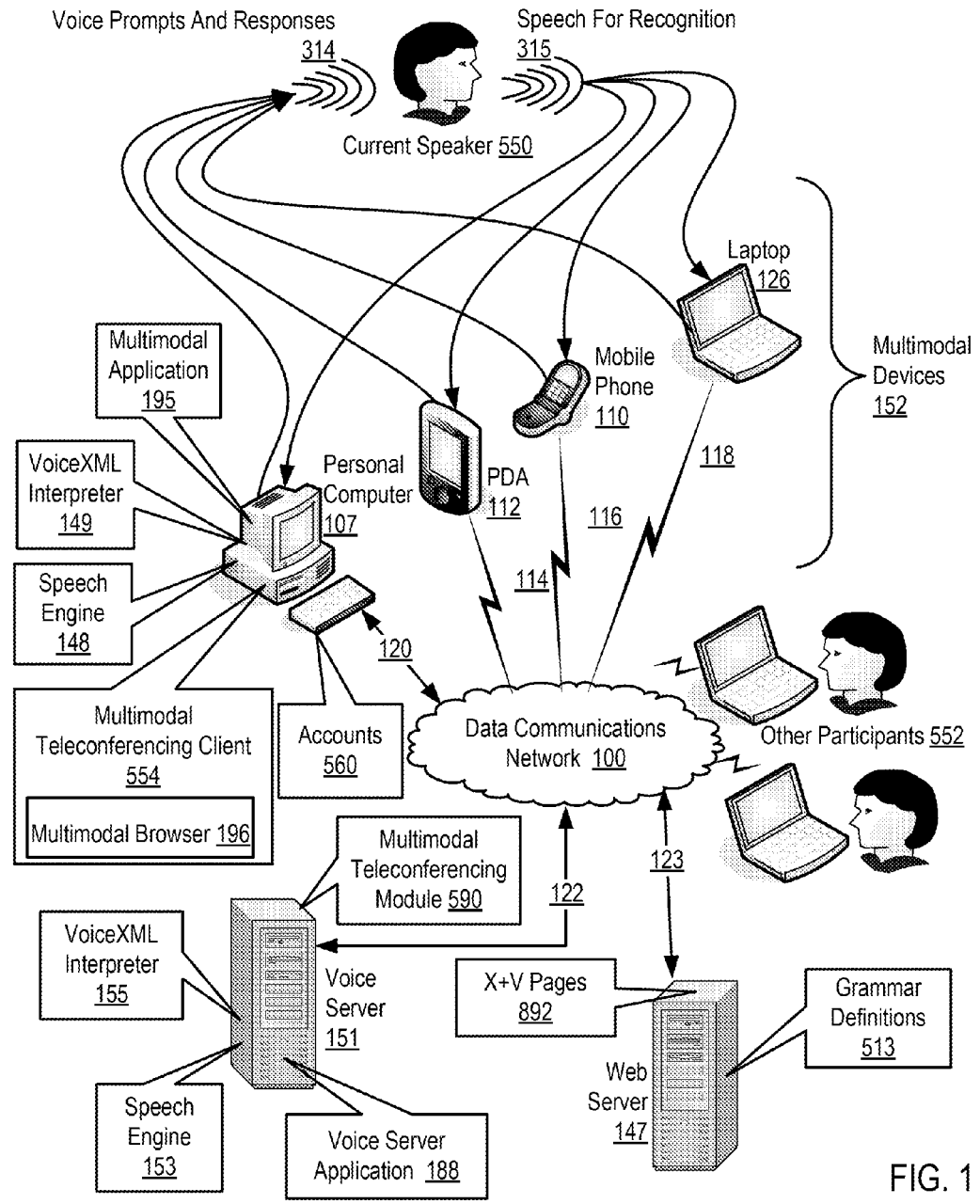
FIG. 1 sets forth a network diagram illustrating an example system for improving speech capabilities of a multimodal application in a multimodal application according to embodiments of the present invention FIG. 2 sets forth a block diagram of automated computing machinery comprising an example of a computer useful as a voice server in improving speech capabilities of a multimodal application according to embodiments of the present invention.

Example methods, apparatus, and products for multimodal teleconferencing are described with reference to the accompanying drawings, beginning with FIG. 1. FIG. 1 sets forth a network diagram illustrating an example system for multimodal teleconferencing according to embodiments of the present invention. A multimodal teleconference is a multi-participant communication over telephony devices that includes visual content for display on a multimodal device. Multimodal teleconferencing in this example is implemented with a multimodal teleconferencing module (590) running on a voice server (151) that supports a multimodal application (195) and that supports a multimodal teleconferencing client (554). The multimodal teleconferencing module of FIG. 1 is capable generally of carrying out multimodal teleconferences according to embodiments of the present invention by receiving, by the multimodal teleconferencing module (590), a speech utterance from one of a plurality of participants (550 and 552) in the multimodal teleconference; identifying, by the multimodal teleconferencing module (590), the participant making the speech utterance as a current speaker (550); retrieving, by the multimodal teleconferencing module from accounts (560) for the current speaker, content for display to the current speaker (550); retrieving, by the multimodal teleconferencing module (590) from accounts (560) for the current speaker (550), content for display to one or more other participants (522) in the multimodal teleconference; providing, by the multimodal teleconferencing module (590) to a multimodal teleconferencing client (554) for display to the current speaker (550), an identification of the speaker and the content retrieved for the speaker; and providing, by the multimodal teleconferencing module (590) to one or more of multimodal teleconferencing clients for display to the other participants (522), an identification of the current speaker with the content retrieved for the one or more other participants in the multimodal teleconference.

A telephony device useful in embodiments of the present invention provides telephony communications among participants of the multimodal teleconference. Telephony encompasses the general use of equipment to provide voice communication over distances. Telephony includes the use of traditional telephones through the public switched telephone network (PSTN), digital telephony devices for digital provisioning of telephone services and systems, IP telephony using the TCP/IP protocol, and many others as will occur to those of skill in the art.

The multimodal teleconferencing client (554) includes a multimodal browser (196) for displaying content retrieved for the multimodal teleconference. The multimodal teleconferencing client (554) and browser support a speech engine (148) operating on a multimodal device (152) or a speech engine (153) residing on a voice server (151). The system of FIG. 1 includes at least one speech recognition grammar (104) that specifies words and phrases to be recognized by an automatic speech recognition ('ASR') engine (150) of a speech engine (148, 153). The multimodal device (152) supports multiple modes of user interaction with the multimodal application including a voice mode and one or more non-voice modes of user interaction with the multimodal application. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal application is operatively coupled (195) to an ASR engine (150) in a speech engine (148). The operative coupling may be implemented with an application programming interface ('API'), a voice service module, or a VOIP connection as explained more detail below.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, a multimodal browser, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled >RTP Payload Format for European Telecommunications Standards Institute (ETSI) European Standard ES 201 108 Distributed Speech Recognition Encoding and the Internet Draft entitled >RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Multimodal applications according to embodiments of the present invention may implement any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

Furthermore, each of the multimodal devices of FIG. 1, personal computer (107), personal digital assistant ('PDA') (112) which is coupled for data communications to data communications network (100) through wireless connection (114), mobile telephone (110), and laptop computer (126), for example, may operate as a telephony device according to embodiments of the present invention and may support a multimodal teleconferencing module (554) according tot embodiments of the present invention.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example runs in a multimodal browser (196). The multimodal client application (195) may include a set or sequence of X+V or SALT documents that execute on the multimodal browser (196). The multimodal browser (196) of FIG. 1 supports the execution of a media player (322) through voice modes and non-voice modes. A media player is automated computing machinery for managing and administering media content in media files such as audio files and video files. Examples of media players that may be modified for use in accordance with the present invention include Music Match™, iTunes®, Songbird™, and others as will occur to those of skill in the art.

A multimodal application (195) in this example running in a multimodal browser (196) provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

A Form Interpretation Algorithm ('FIA') drives the interaction between the user and a multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention. Each of the example multimodal devices (152) in the system of FIG. 1 may be configured to carry out multimodal teleconferencing according to the present invention. The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for improving speech capabilities of a multimodal application according to the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network useful for multimodal teleconferencing in a multimodal application according to embodiments of the present invention is a data communications network that includes at least a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
a data communications network layer with the Internet Protocol ('IP'),
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents (892) that compose multimodal applications. The web server (147) typically provides such markup documents via a data communications protocol, HTTP, HDTP, WAP, or the like. That is, although the term 'web' is used to describe the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (147), the voice server (151), and the data communications network (100) making up the example system illustrated in FIG. 1 are for explanation, not for limitation. Data processing systems useful for multimodal teleconferencing according to the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Multimodal teleconferencing according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151). The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured for use in multimodal teleconferencing according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support embodiments of the present invention may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog"><![CDATA[
    #JSGF V1.0;
    grammar command;
    <command> = [remind me to] call | phone | telephone <name>
    <when>; <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a multimodal application.

As mentioned above, a Form Interpretation Algorithm ('FIA') drives the interaction between the user and a multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 2:
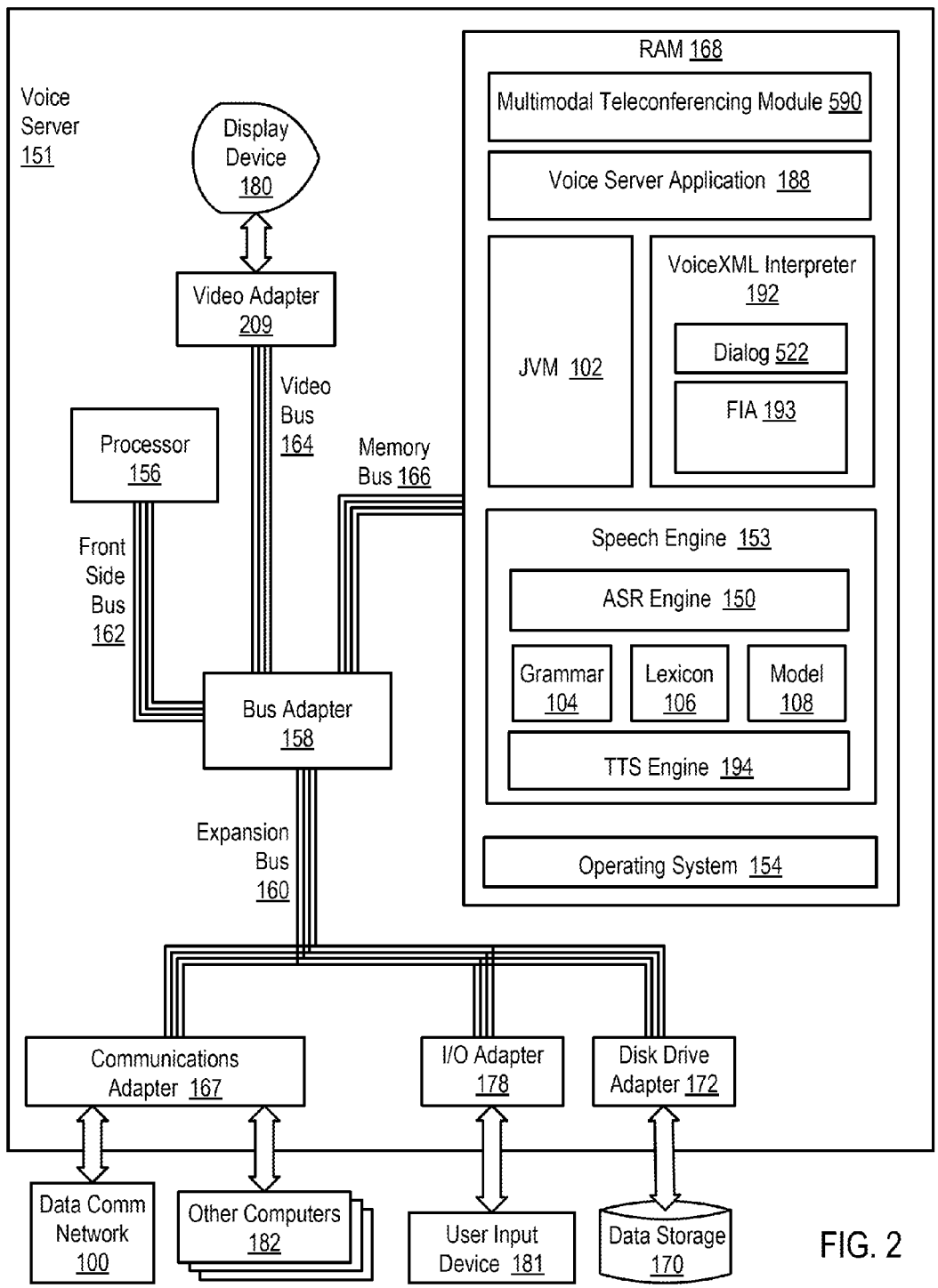

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example voice server (151) of FIG. 2 includes a communications adapter (167) for data communications with other computers (182) and for data communications with a data communications network (100). Such data communications may be carried out serially through RS-232 connections, through external buses such as a Universal Serial Bus (USW), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Voice server (151) of FIG. 2 includes a multimodal teleconferencing module (590), a module of automated computing machinery for multimodal teleconferencing according to the present invention. The multimodal teleconferencing module of FIG. 2 includes computer program instructions for receiving a speech utterance from one of a plurality of participants in the multimodal teleconference; identifying the participant making the speech utterance as a current speaker; retrieving, from accounts for the current speaker, content for display to the current speaker; retrieving, from accounts for the current speaker, content for display to one or more other participants in the multimodal teleconference; providing, to a multimodal teleconferencing client for display to the current speaker, an identification of the speaker and the content retrieved for the speaker; and providing, to one or more of multimodal teleconferencing clients for display to the other participants, an identification of the current speaker with the content retrieved for the one or more other participants in the multimodal teleconference. The multimodal teleconferencing module of FIG. 2 also includes computer program instructions for receiving speech from the current speaker; creating text from the speech; and providing, to the multimodal teleconferencing clients for all participants in the multimodal teleconference, the text as a transcript of the multimodal teleconference.

The multimodal teleconferencing module (590) of FIG. 2 also includes computer program instructions for identifying, by the multimodal teleconferencing module, the participant making the speech utterance as a current speaker further by receiving speech from the current speaker; and determining whether the speech matches the voiceprint of a participant of the multimodal teleconference. The multimodal teleconferencing module of FIG. 2 also includes computer program instructions for identifying the caller as a valid participant in the multimodal telephone conference by receiving speech from the current speaker; identifying the telephone number of the current speaker; and determining whether the phone number of the current speaker matches a known number of a participant of the multimodal teleconference.

Figure 3:
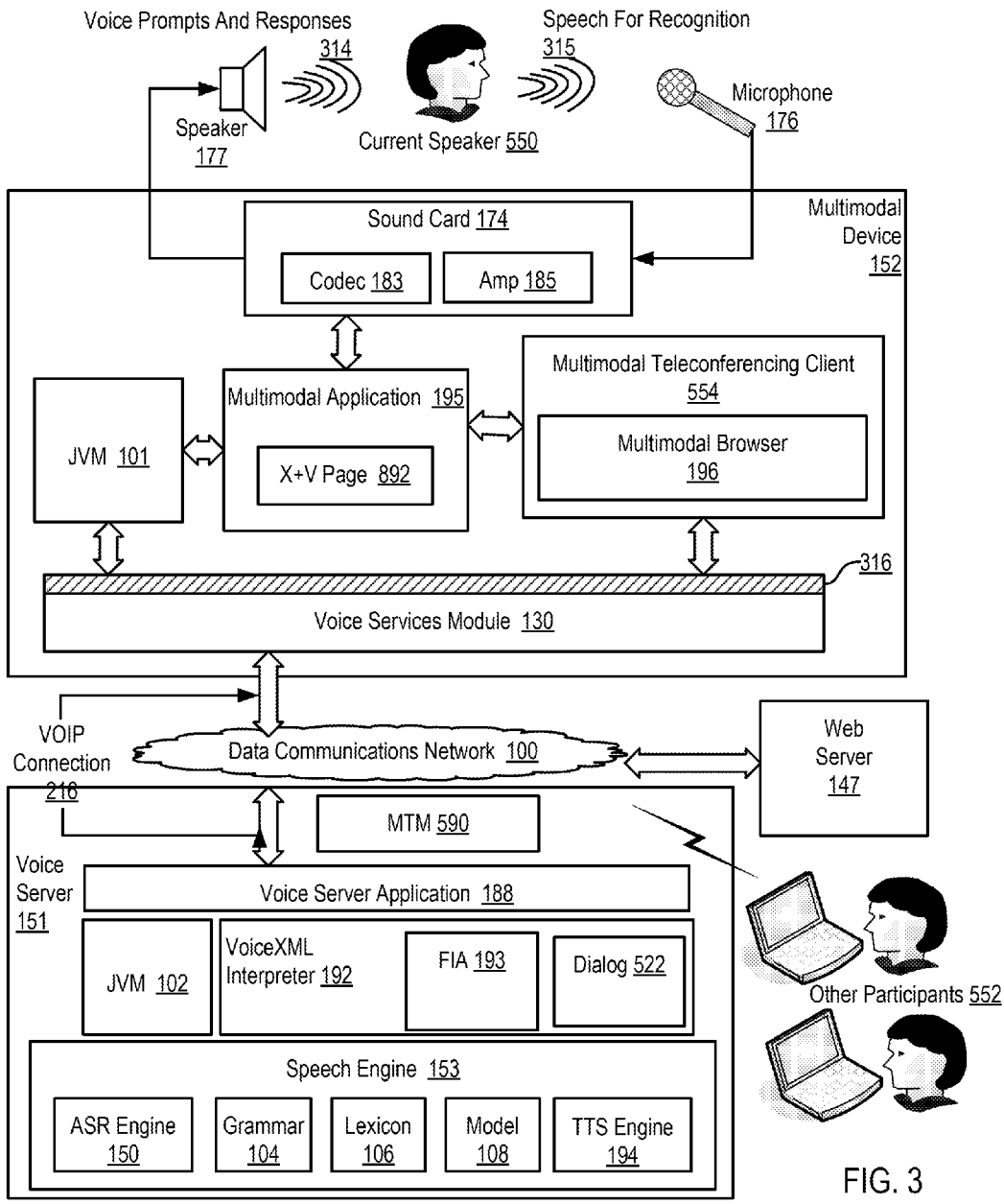
FIG. 3 sets forth a functional block diagram of example apparatus for improving speech capabilities of a multimodal application in a thin client architecture according to embodiments of the present invention.

For further explanation, FIG. 3 sets forth a functional block diagram of example apparatus for multimodal teleconferencing in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V (892) or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimodal application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

Voice server (151) of FIG. 3 includes a multimodal teleconferencing module (590), a module of automated computing machinery for multimodal teleconferencing according to the present invention. The multimodal teleconferencing module of FIG. 3 includes computer program instructions for receiving a speech utterance from one of a plurality of participants in the multimodal teleconference; identifying the participant making the speech utterance as a current speaker; retrieving, from accounts for the current speaker, content for display to the current speaker; retrieving, from accounts for the current speaker, content for display to one or more other participants in the multimodal teleconference; providing, to a multimodal teleconferencing client (554) for display to the current speaker (550), an identification of the speaker and the content retrieved for the speaker; and providing, to one or more of multimodal teleconferencing clients for display to the other participants (552), an identification of the current speaker with the content retrieved for the one or more other participants in the multimodal teleconference. The multimodal teleconferencing module of FIG. 3 also includes computer program instructions for receiving speech from the current speaker; creating text from the speech; and providing, to the multimodal teleconferencing clients for all participants in the multimodal teleconference, the text as a transcript of the multimodal teleconference.

The multimodal teleconferencing module (590) of FIG. 3 also includes computer program instructions for identifying, by the multimodal teleconferencing module, the participant making the speech utterance as a current speaker further by receiving speech from the current speaker; and determining whether the speech matches the voiceprint of a participant of the multimodal teleconference. The multimodal teleconferencing module of FIG. 3 also includes computer program instructions for identifying the caller as a valid participant in the multimodal telephone conference by receiving speech from the current speaker; identifying the telephone number of the current speaker; and determining whether the phone number of the current speaker matches a known number of a participant of the multimodal teleconference.

A client side multimodal application (195), in some embodiments of the present invention, may run in multimodal teleconferencing client (554) including a multimodal browser (196) for speech navigation of content of the multimodal teleconference. The multimodal teleconferencing client of FIG. 3 is capable generally of receiving content for display to the current speaker (550) and displaying the content during the multimodal teleconference. Similarly, multimodal teleconferencing clients are capable of receiving content for display to the other participants (552) and displaying the content during the multimodal teleconference. The multimodal teleconferencing client of FIG. 3 is also capable of receiving content for display to the current speaker (550) and displaying the content during the multimodal teleconference receiving a speech utterance identifying another particular participant of interest or receiving through a non-voice mode user input device an identification of another particular participant of interest; requesting, from the multimodal teleconferencing module; content of the another particular participant of interest; and displaying, by the multimodal teleconferencing client to the listening participant, the content of the another particular participant of interest.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and either JVM (102), VoiceXML interpreter (192), or SALT interpreter (103), depending on whether the multimodal application is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 4). So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
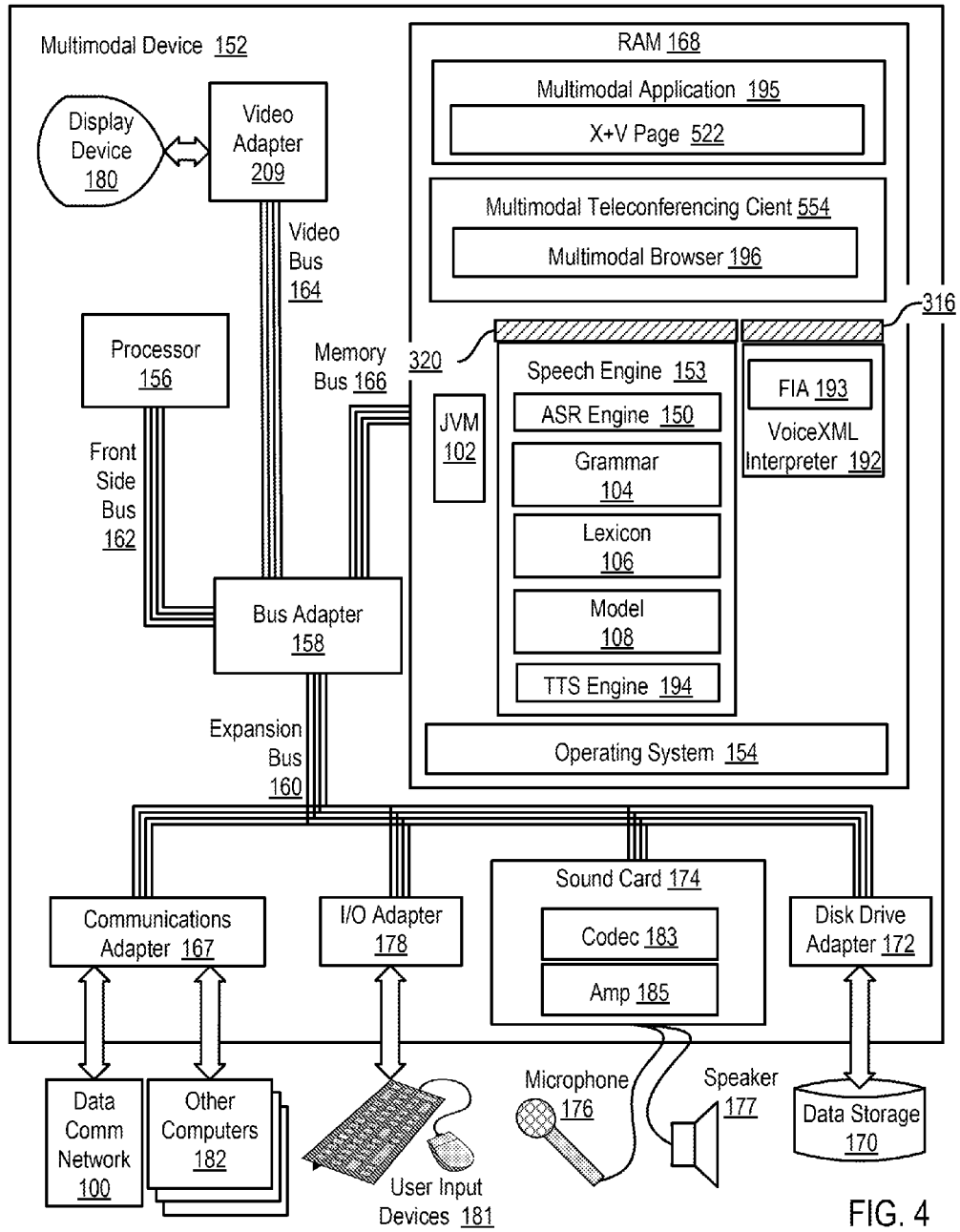
FIG. 4 sets forth a block diagram of automated computing machinery comprising an example of a computer useful as a multimodal device in improving speech capabilities of a multimodal application according to embodiments of the present invention.

Multimodal teleconferencing according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) for multimodal teleconferencing according to embodiments of the present invention. In a multimodal device implementing a thick client architecture as illustrated in FIG. 4, the multimodal device (152) has no connection to a remote voice server for use with a VoiceXML interpreter and a speech engine. All the components needed for speech synthesis and voice recognition according to embodiments of the present invention are installed or embedded in the multimodal device itself. The device (152) of FIG. 4 does however maintain a connection with a multimodal teleconferencing module residing on a server to carry out multimodal teleconferencing according to embodiments of the present invention.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 4, the speech engine in the multimodal device of FIG. 2 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm (FIX) (193).

The speech engine (153) in this kind of embodiment, a thick client architecture, often is implemented as an embedded module in a small form factor device such as a handheld device, a mobile phone, PDA, and the like. An example of an embedded speech engine useful according to embodiments of the present invention is IBM's Embedded Via Voice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports embodiments of the present invention. The multimodal application (195) runs with a multimodal browser (196) and implements speech recognition by accepting speech for recognition from a user and sending the speech for recognition through API calls to the ASR engine (150). The multimodal application (195) and the multimodal browser (196) implement speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In further example embodiments, the multimodal application (195) may be implemented as a set or sequence X+V documents or SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

The multimodal application (195) is operatively coupled to the ASR engine (150) through an API (320). In this example, the operative coupling between the multimodal application and the ASR engine (150) is implemented by either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment for the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for speech recognition—is implemented on the multimodal device itself.

At least a portion of the client side multimodal application (195), in some embodiments of the present invention, may also run in multimodal teleconferencing client (554) including a multimodal browser (196) for speech navigation of content of the multimodal teleconference. The multimodal teleconferencing client of FIG. 4 is capable generally of receiving content for display to the current speaker (550) and displaying the content during the multimodal teleconference. Similarly, multimodal teleconferencing clients are capable of receiving content for display to the other participants (552) and displaying the content during the multimodal teleconference.

The multimodal teleconferencing client of FIG. 4 is capable generally of receiving content for display to the current speaker (550) and displaying the content during the multimodal teleconference. Similarly, multimodal teleconferencing clients are capable of receiving content for display to the other participants (552) and displaying the content during the multimodal teleconference. The multimodal teleconferencing client of FIG. 4 is also capable of receiving content for display to the current speaker (550) and displaying the content during the multimodal teleconference receiving a speech utterance identifying another particular participant of interest or receiving through a non-voice mode user input device an identification of another particular participant of interest; requesting, from the multimodal teleconferencing module; content of the another particular participant of interest; and displaying, by the multimodal teleconferencing client to the listening participant, the content of the another particular participant of interest.

Figure 5:
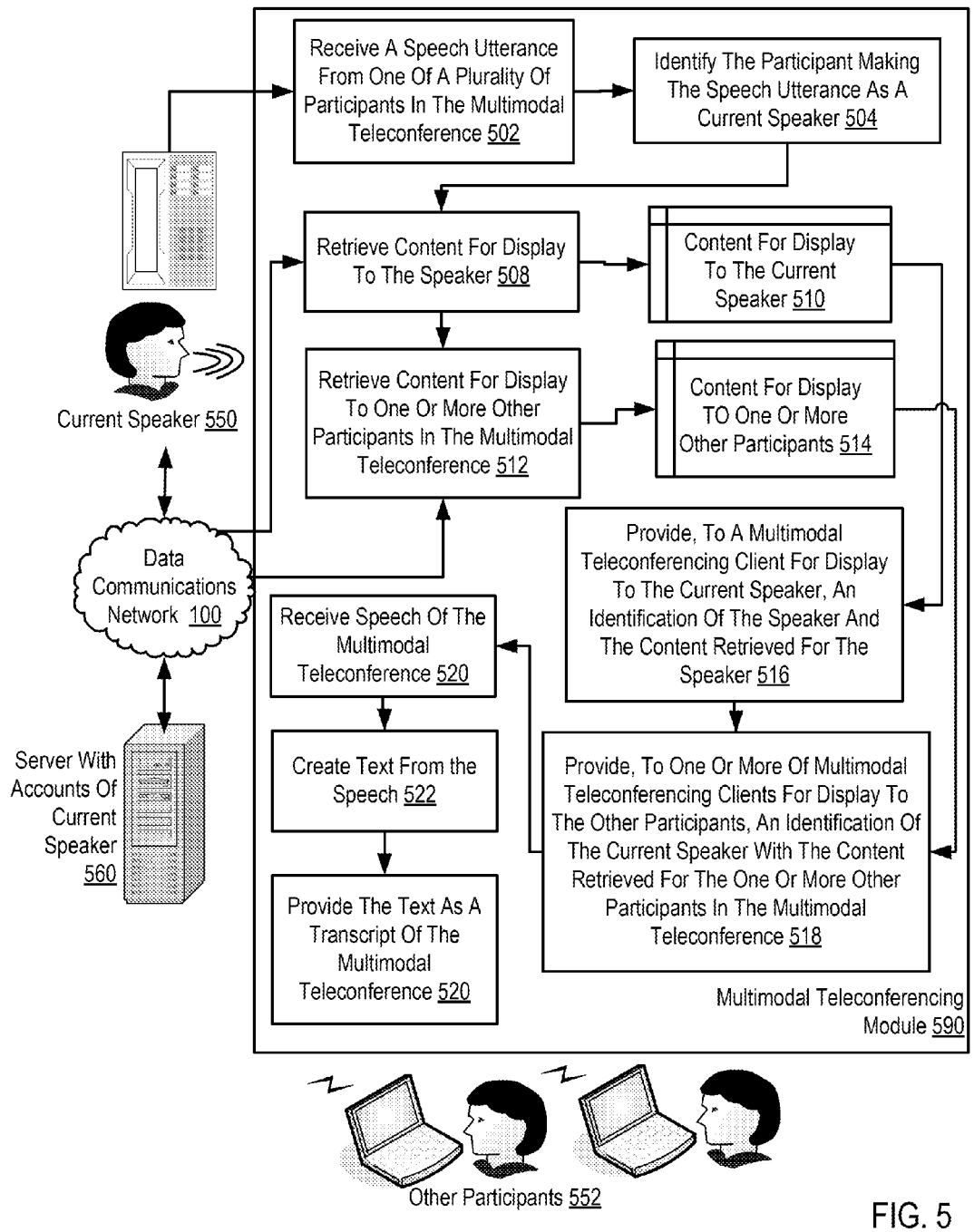
FIG. 5 sets forth a flowchart illustrating an example method of multimodal teleconferencing according to embodiments of the present invention.

For further explanation, FIG. 5 sets forth a flowchart illustrating an example method of multimodal teleconferencing according to embodiments of the present invention. The method of FIG. 5 is implemented with the multimodal application and a multimodal teleconferencing module, a module of automated computing machinery operating on a server supporting a voice mode including accepting speech input from participants of the multimodal teleconference through a telephony interface, digitizing the speech, and providing digitized speech to a speech engine, The method of FIG. 5 includes receiving (502), by the multimodal teleconferencing module (590), a speech utterance from one (550) of a plurality of participants in the multimodal teleconference. Receiving (502) a speech utterance from one of a plurality of participants in the multimodal teleconference is carried out through a telephony connection with the multimodal teleconferencing module and a telephony device available to each of the participants of the multimodal teleconference. As mentioned above, telephony encompasses the general use of equipment to provide voice communication over distances. A telephony call may include traditional telephones through the public switched telephone network (PSTN), digital telephony devices for digital provisioning of telephone services and systems, IP telephony using the TCP/IP protocol, and many others as will occur to those of skill in the art.

The method of FIG. 5 also includes identifying (504), by the multimodal teleconferencing module (590), the participant (550) making the speech utterance as a current speaker (550). Identifying (504), by the multimodal teleconferencing module (590), the participant (550) making the speech utterance as a current speaker (550) may be carried out by receiving speech from the current speaker and determining whether the speech matches the voiceprint of a participant of the multimodal teleconference as discussed below with reference to FIG. 6. Identifying the caller as a valid participant in the multimodal telephone conference may be carried out by receiving speech from the current speaker; identifying the telephone number of the current speaker; and determining whether the phone number of the current speaker matches a known number of a participant of the multimodal teleconference as discussed below with reference to FIG. 7.

The method of FIG. 5 also includes retrieving (508), by the multimodal teleconferencing module (590) from accounts (560) for the current speaker (550), content (510) for display to the current speaker (550). Retrieving by the multimodal teleconferencing module from accounts for the current speaker, content for display to the current speaker may include retrieving email for the current speaker concerning the multimodal teleconference, biographical information about the current speaker, documents of the current speaker related to the multimodal teleconference, or other content as will occur to those of skill in the art. Accounts (560) for the current speaker (550) may include user accounts or group accounts to which the current speaker has authority to share content. Such accounts may include email accounts, folders containing documents or presentations, accounts with media providers, storage on servers and so on as will occur to those of skill in the art. Content for display for the current speaker may include materials that are personalized for the valid participant such as speaker notes, confidential documents and so on.

The method of FIG. 5 also includes retrieving (512), by the multimodal teleconferencing module (590) from accounts for the speaker (550), content (514) for display to one or more other participants (552) in the multimodal teleconference. Retrieving by the multimodal teleconferencing module from accounts for the current speaker, content for display to one or more other participants in the multimodal teleconference may include retrieving email for the current speaker concerning the multimodal teleconference, biographical information about the current speaker, documents of the current speaker related to the multimodal teleconference or other content as will occur to those of skill in the art. Content for display to the other participants may include materials that are not confidential or are less confidential than those retrieved for display to the current speaker, generic documents, or others as will occur to those of skill in the art.

The method of FIG. 5 also includes providing (516), by the multimodal teleconferencing module (590) to a multimodal teleconferencing client for display to the current speaker (550), an identification of the speaker and the content (510) retrieved for the speaker. The identification of the speaker and the content for display to the current speaker may then be displayed to the current speaker on the local multimodal teleconferencing client.

The method of FIG. 5 also includes providing (518), by the multimodal teleconferencing module (590) to one or more of multimodal teleconferencing clients for display to the other participants (522), an identification of the current speaker (550) with the content (514) retrieved for the one or more other participants in the multimodal teleconference. The identification of the speaker and the content for display to the other participants may then be displayed to each of the participants local multimodal teleconferencing clients.

The method of FIG. 5 also includes receiving (520), by the multimodal teleconferencing module, speech from the current speaker (550). Receiving (520), by the multimodal teleconferencing module, speech from the current speaker (550) may be carried out using a telephony device coupled for data communications with the multimodal teleconferencing module.

The method of FIG. 5 also includes creating (522), by the multimodal teleconferencing module (590), text from the speech. Creating, by multimodal teleconferencing module, text from the speech may be carried out by calling an API in a speech engine residing on a voice server coupled for data communications with the multimodal teleconferencing module as discussed above.

The method of FIG. 5 also includes providing (520), by the multimodal teleconferencing module (590) to the multimodal teleconferencing clients for all participants in the multimodal teleconference, the text as a transcript of the multimodal teleconference. The transcript may then be displayed by each of the multimodal teleconferencing clients to the participants of the multimodal teleconference.

Figure 6:
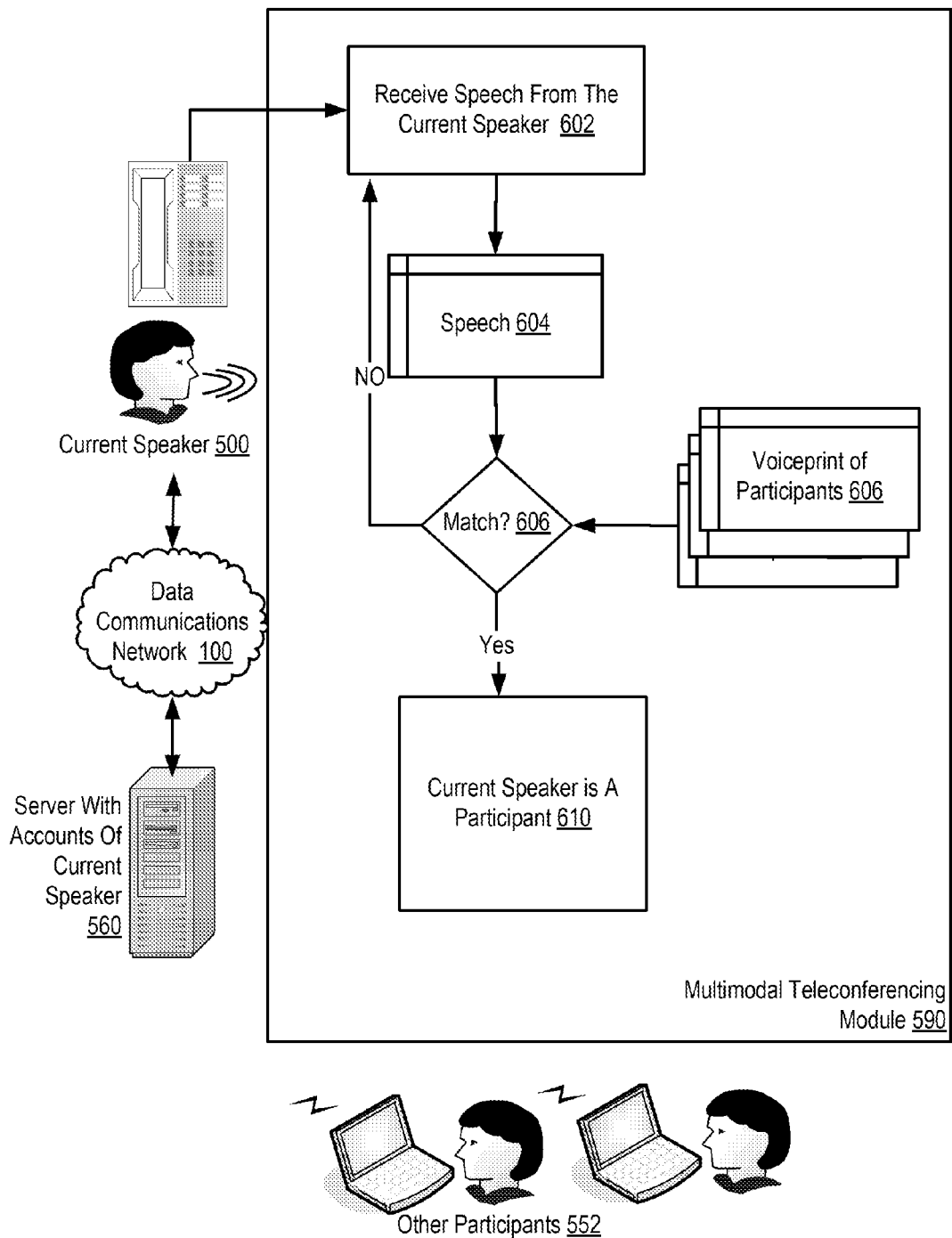
FIG. 6 sets forth a flow chart illustrating an example method of identifying a participant making a speech utterance as a current speaker.

For further explanation, FIG. 6 sets forth a flow chart illustrating an example method of identifying, by the multimodal teleconferencing module, the participant making the speech utterance as a current speaker. The method of FIG. 6 includes receiving (602) speech from the current speaker (550) and determining (606) whether the speech matches the voiceprint (606) of a participant of the multimodal teleconference. A voice print for the valid participant models the physiological characteristics of the particular participants voice and can be used to authenticate that valid participant's identity. Authentication against a voice print is based on inherent properties of the speaker's voice, so it often provides a higher level of security than prompting for a password or personal identification number. Voiceprints for all participants of the multimodal teleconference may be gathered prior to the multimodal teleconference and stored for authenticating current speakers upon receiving speech from those participants.

If a new current speaker is identified, then multimodal teleconferencing according to the present invention may proceed by retrieving content for display to the new current speaker; retrieving content for display to one or more other participants in the multimodal teleconference, and providing the content for display to the current speaker and the other participants. If a new current speaker is not identified, no new content is retrieved.

Figure 7:
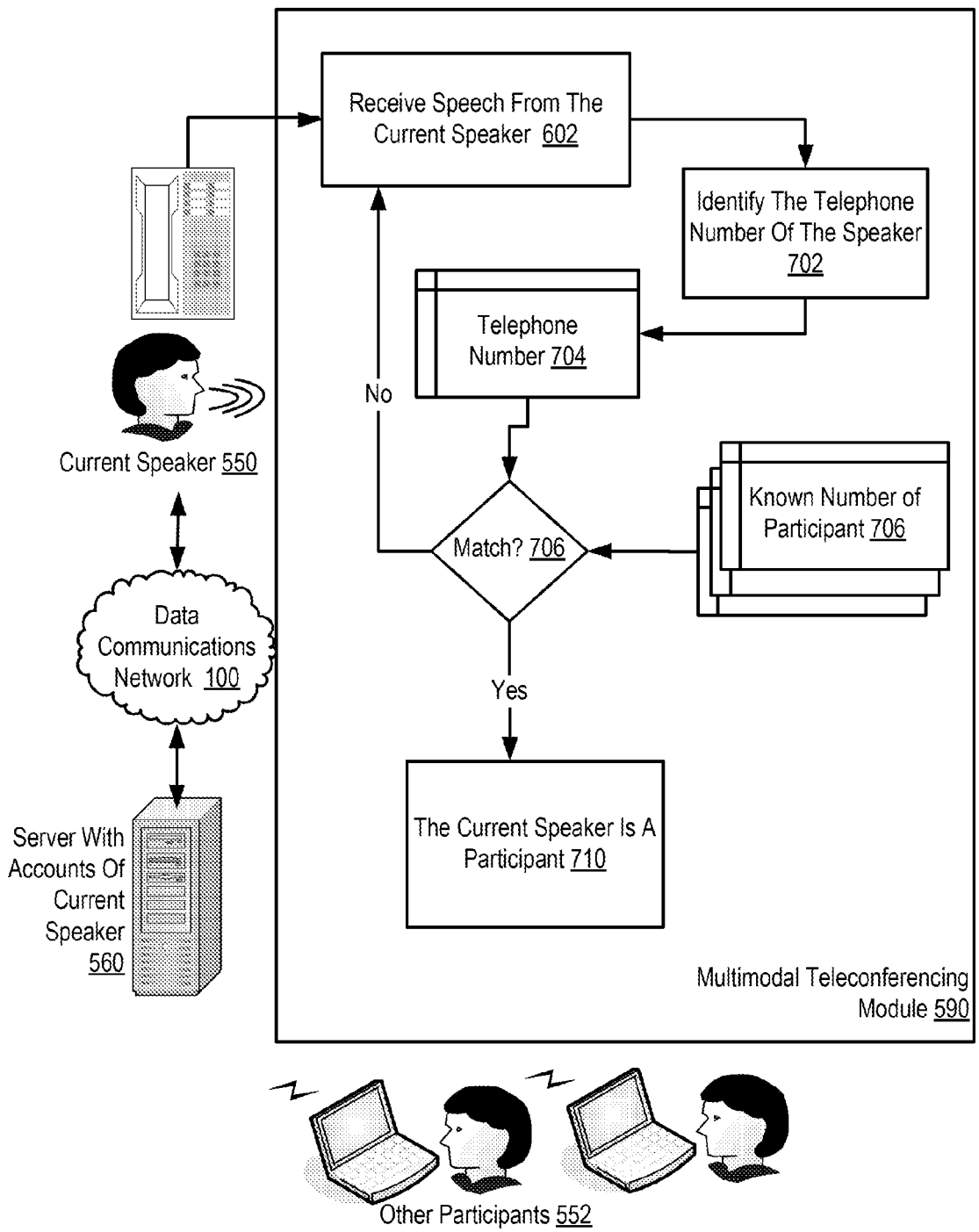
FIG. 7 sets forth a flow chart illustrating another example method of identifying a participant making a speech utterance as a current speaker.

For further explanation, FIG. 7 sets forth a flow chart illustrating another example method of identifying the caller as a valid participant in the multimodal telephone conference according to embodiments of the present invention. The method of FIG. 7 includes receiving (602) speech from the current speaker (550) and identifying (702) the telephone number of the current speaker in response to receiving the speech. Automatic Number Identification 'ANI' is a feature of telephony intelligent network services that may be used by a multimodal teleconferencing module to capture the telephone numbers of calling parties. ANI has two components, information digits, which identify the class of service, and the calling party telephone number.

The method of FIG. 7 also includes determining whether the phone number of the current speaker matches a known number of a participant of the multimodal teleconference. A well known number for the participants are numbers previously determined to be associated with the valid participants of the multimodal teleconference. Well known numbers for all invited participants may be gathered prior to the multimodal teleconference and stored for authenticating valid participants upon receiving each call into the multimodal teleconference.

If a new current speaker is identified, then multimodal teleconferencing according to the present invention may proceed by retrieving content for display to the new current speaker; retrieving content for display to one or more other participants in the multimodal teleconference, and providing the content for display to the current speaker and the other participants. If a new current speaker is not identified, no new content is retrieved.

During a multimodal teleconference, participants may desire to view content of participants other than the current speaker. For further explanation, therefore, FIG. 8 sets forth a flow chart illustrating additional aspects of multimodal teleconferencing according to embodiments of the present invention. The method of FIG. 8 includes receiving (802), by the multimodal teleconferencing client (554) of listening participant (800) other than the current speaker, a speech utterance identifying another particular participant of interest (862). Another particular participant of interest. (862) may be an participant of the multimodal teleconference typically other than the listening participant of interest and the current speaker. In some embodiments not illustrated, the another particular participant of interest. (862) is the same participant as the listening participant (800). That is, a participant may identify themselves and receive content for themselves for display on the multimodal teleconferencing client.

Figure 8:
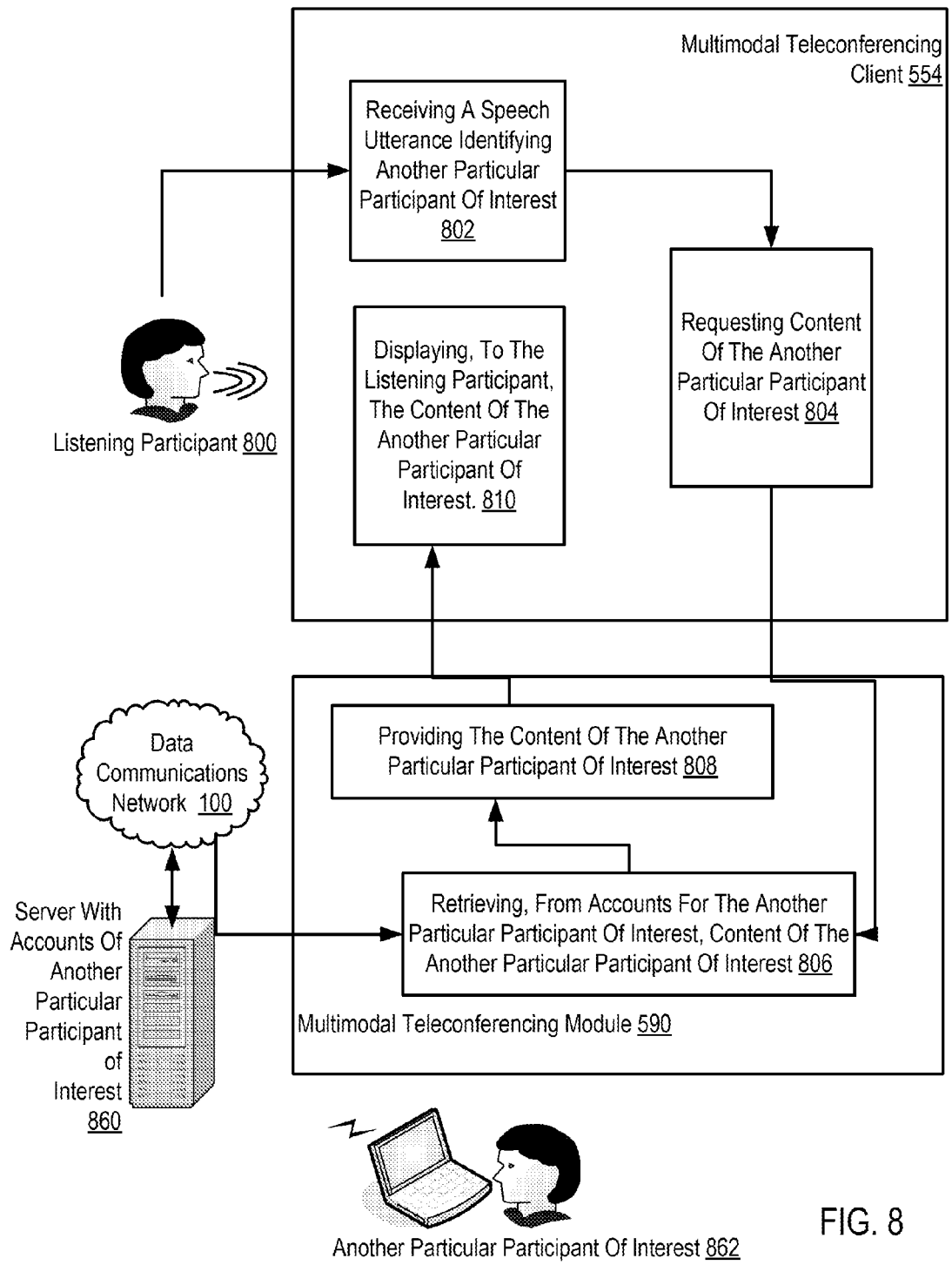
FIG. 8 sets forth a flow chart illustrating additional aspects of multimodal teleconferencing according to embodiments of the present invention.

The method of FIG. 8 also includes requesting (804), by the multimodal teleconferencing client (554) from the multimodal teleconferencing module (590), content of the another particular participant of interest. Requesting (804), by the multimodal teleconferencing client (554) from the multimodal teleconferencing module (590), content of the another particular participant of interest may be carried out through the use of any data communications protocol supported by both the multimodal teleconferencing client (554) and the multimodal teleconferencing module (590) such as HTTP, WAP, SIP, and so on as will occur to those of skill in the art.

The method of FIG. 8 also includes retrieving (806), by the multimodal teleconferencing module (590) from accounts for the another particular participant of interest, content of the another particular participant of interest (862).

Retrieving (806), by the multimodal teleconferencing module (590) from accounts for the another particular participant of interest, content of the another particular participant of interest (862) may include retrieving email for the another particular participant of interest (862) concerning the multimodal teleconference, biographical information about the another particular participant of interest (862), documents of the another particular participant of interest (862) related to the multimodal teleconference or other content as will occur to those of skill in the art.

The method of FIG. 8 also includes providing (808), by the multimodal teleconferencing module (590)) to a multimodal teleconferencing client (554) for display to the listening participant (800), the content of the another particular participant of interest (862). Providing (808) the content of the another particular participant of interest (862) may be carried out through the use of any data communications protocol supported by both the multimodal teleconferencing client (554) and the multimodal teleconferencing module (590) such as HTTP, WAP, SIP, and so on as will occur to those of skill in the art.

The method of FIG. 8 also includes displaying (810), by the multimodal teleconferencing client (554) to the listening participant (800), the content of the another particular participant of interest (862). Displaying (810), by the multimodal teleconferencing client (554) to the listening participant (800), the content of the another particular participant of interest (862) may be carried out through the use of a multimodal browser of the multimodal teleconferencing client.

Multimodal teleconferencing provides for interaction through voice modes and non-voice modes. For further explanation, therefore, FIG. 9 sets forth a flow chart illustrating additional aspects of multimodal teleconferencing according to embodiments of the present invention. The method of FIG. 9 is similar to the method of FIG. 8 in that the method of FIG. 9 includes requesting (804), by the multimodal teleconferencing client (554) from the multimodal teleconferencing module (590); content of the another particular participant of interest (862); retrieving (806), by the multimodal teleconferencing module from accounts (860) for the another particular participant of interest (862), content of the another particular participant of interest (862); providing (808), by the multimodal teleconferencing module (580) to a multimodal teleconferencing client (554) for display to the listening participant (800), the content of the another particular participant of interest; and displaying (810)=, by the multimodal teleconferencing client (554) to the listening participant (800), the content of the another particular participant of interest.

Figure 9:
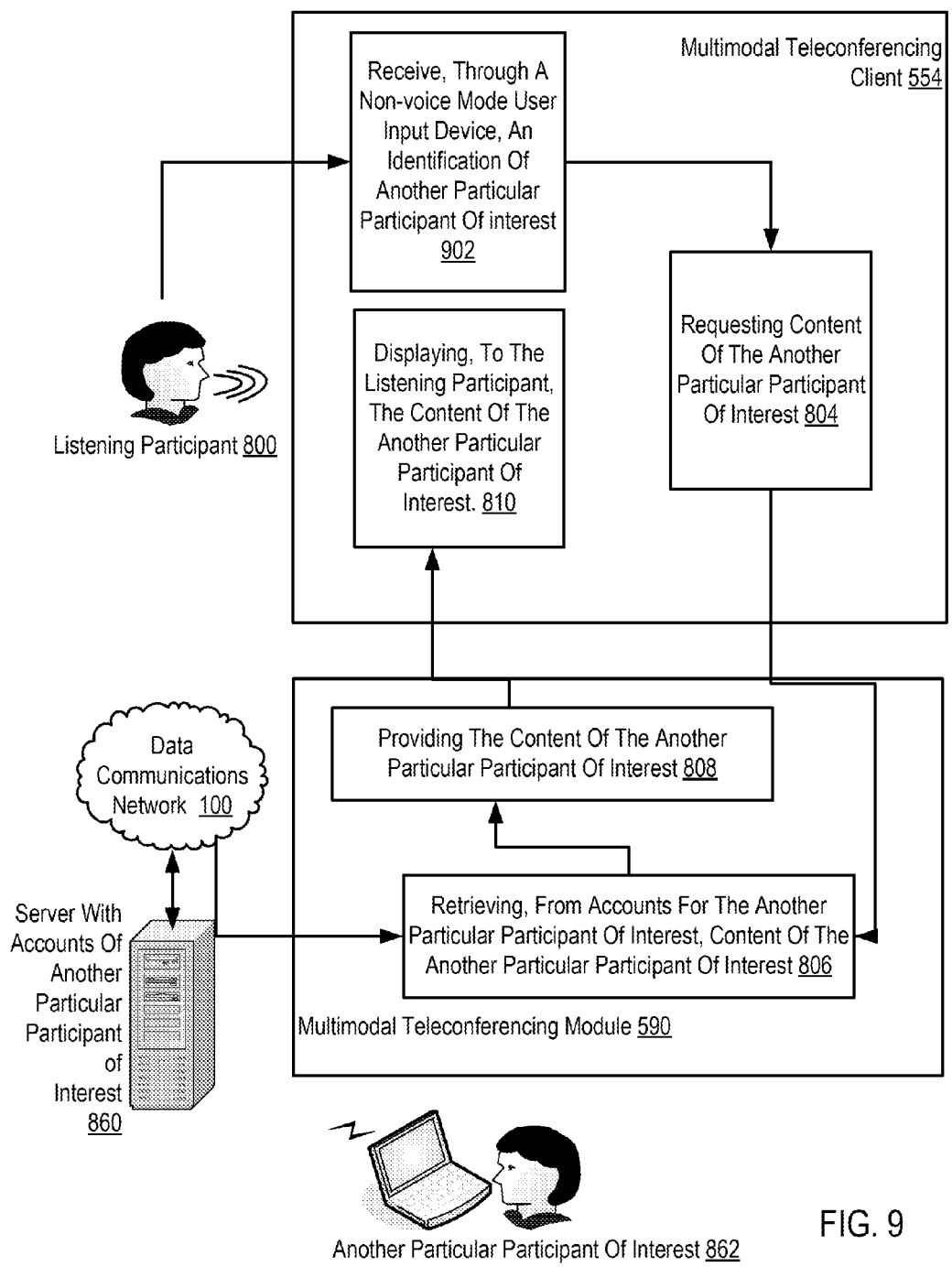
FIG. 9 sets forth a flow chart illustrating additional aspects of multimodal teleconferencing according to embodiments of the present invention.

The method of FIG. 9 differs from the method of FIG. 9 in that instead of receiving, by the multimodal teleconferencing client of listening participant other than the current speaker, a speech utterance identifying another particular participant of interest, the method of FIG. 9 includes receiving (902), by the multimodal teleconferencing client (554) of listening participant (800) other than the current speaker through a non-voice mode user input device, an identification of another particular participant of interest (862). Receiving (902), by the multimodal teleconferencing client (554) of listening participant (800) other than the current speaker through a non-voice mode user input device, an identification of another particular participant of interest (862) may be carried out though a mouse click on a GUI, keystrokes on a keyboard, invocation of a touch sensitive screen or in any other manner as will occur to those of skill in the art.

For further explanation, consider the following portion of a multimodal application for use by a multimodal teleconferencing module to carry out aspects of multimodal teleconferencing according to the present invention.

```
<!DOCTYPE html PUBLIC "-//VoiceXML Forum//DTD XHTML+Voice 1.2//EN"
"http://www.voicexml.org/specs/multimodal/x+v/12/dtd/xhtml+voicel2.dtd">
<html xmlns="http://www.w3.org/1999/xhtml"
    xmlns:vxml="http://www.w3.org/2001/vxml"
    xmlns:ev="http://www.w3.org/2001/xml-events"
    xmlns:xv="http://www.voicexml.org/2002/xhtml+voice" xml:lang="en-US">
  <head>
    <title>Multimodal Teleconferencing</title>
    <script type="text/javascript">
    <![CDATA[
    // List of valid participants
    var gParticipants = new array;
```

```
// This is an Ajax function that causes the current speaker to be
// updated asynchronously from the server.
function waitForNewCurrentSpeaker( )
{
  // Create an XMLHttpRequest object with its call back funtion
  var xmlhttp = new XMLHttpRequest( );
  xmlhttp.onreadystatechange =
    function( )
    {
      if(xmlhttp.readyState==4)
      {
        // Triger the content to be updated with a new current speaker
        selectParticipant(xmlhttp.responseText);
        // Set up a new Ajax listener to wait for the next new speaker
        waitForNewCurrentSpeaker( );
      }
    }
  // Send a request to the web server to be notified of a new speaker
  xmlhttp.open("GET","newspeaker.jsp", true);
  xmlhttp.send(null);
}
function getValidParticipants( )
{
  // This function uses queries the conference system for the list
  // of valid participants and puts their names in the variable "gParticipants"
}
function updateParticipants( )
{
  var grammar_choice = document.getElementById("choice");
  var select_element = document.getElementById("particpants");
  var aOption, aItem, aText;
  for (name in gParticipants)
  {
    // Update the graphical selection list by creating <option> elements and
    // appending them as children to the <select> element.
    aOption = document.createElement('option');
    aText = document.CreateTextNode(name);
    aOption.AppendChild(aText);
    aOption.SetAttribute('value', name);
    select_element.appendChild(aOption)
    // Update the grammar choice list by creating <item> elements and appending
    // them as children of the <one-of> element
    aItem = document.createElement('item');
    aText = document.CreateTextNode(name);
    aItem.appendChild(aText);
    grammar_choice.appendChild(aItem);
  }
}
function selectParticipant(name)
{
  // This function searches the select list for the index of the given name and then
  // sets the selectedIndex to that. Changing selectedIndex fires the list's
onchange( )
  var list = document.getElementById('participants');
  for (i=0; i < list.options.length; i++)
  {
    if(list.options[i].value == name)
      break;
  }
  list.selectedIndex = i;
}
function updateCurrentSpeaker(list)
{
  var index = list.selectedIndex;
  var current = document.getElementById('currentSpeaker');
  current.value = list.options[selIndex].value;
  updateCurrentSpeakerContent( );
}
function updateCurrentSpeakerContent( )
{
  var name document.getElementById('currentSpeaker');
  // This function retrieves content for the current speaker
  // using well known methods like Ajax
}
]]>
</script>
<script id="InitParticipants" type="text/javascript">
  updateParticipants( );
  waitForNewCurrentSpeaker( );
</script>
```

```
<!-- First prompt for the artist name -->
<vxml:form id="vform1" name="vform1">
  <vxml:field name="name">
    <vxml:grammar id="namelist">
      <rule id="paricipant-names" scope="public">
        <one-of id="choice" ><tag>$choice=$</tag></one-of>
        <!-- After UpdateParticipants( ) runs the grammar will have the following
choices
        <one-of>
          <item>Bill Bodin</item>
          <item>Chris Cross</item>
          <item>Ciprian Agapi</item>
        </one-of>
        -->
      </rule>
    </vxml:grammar>
    <vxml:filled>
      <!-- Trigger the content to update for the selected name -->
      <vxml:assign name="temp" expr="selectParticipant($choice)"/>
    </vxml:filled>
  </vxml:field>
  <!-- After trigerring an update of the content the we just start the voice form
       listening again for the next choice -->
  <vxml:goto nextitem="vform1"/>
</vxml:form>
<!-- When the document load it first gets the conference participants and then starts
     a voice form to wait for the user's choice. -->
<listener event="load" observer="main" target="main" handler="#InitParticipants( )"/>
<listener event="load" observer="main" target="main" handler="#vform1"/>
</head>
<body id="main">
  <form action="">
    <p>Conference Participants</p>
    <select id="particpants" size="5" onchange="updateCurrentSpeaker(this)"/>
    <!-- After UpdateParticipants( ) runs the selection list contains the following
options
    <select>
      <option value="Bill Bodin">Bill Bodin<option/>
      <option value="Chris Cross">Chris Cross<option/>
      <option value="Ciprian Agapi">Ciprian Agapi<option/>
    </select>
    -->
    <br/>
    <p>Current Speaker
    <input type='text' id='currentSpeaker'/>
    </p>
    <!-- The rest of the content on the page is created dynamically
         by the function updateCurrentSpeakerContent( ) -->
  </form>
</body>
</html>
```

In the example above, the function waitForNewCurrentSpeaker( ) is an Ajax function that waits for a new speaker to be identified and triggers content to be retrieved for display to the current speaker and the other participants of the multimodal teleconference. The waitForNewCurrentSpeaker also enables a listener to wait for another speaker to be identified.

The function xmlhttp.onreadystatechange=function( ) in the example above is a Javascript function that dynamically triggers the retrieval of new content from accounts of the current speaker for display to the current speaker and to other participants of the multimodal teleconference. The function getValidParticipants( ) in the example above queries for a list of participants in the multimodal teleconference and includes the names of the participants in a variable "gParticipants."

The function updateParticipants( ) in this example updates the content for display to the participants other than the speaker and updates the elements of each page displayed to the participants of the multimodal teleconference. updateParticipants( ) also loads a grammar allowing the current speaker to navigate content displayed using speech. The function updateCurrentSpeakerContent( ) in this example retrieves content for display to the current speaker.

The voice form vform1 wasst for speech of a participant to be identified as the next current speaker. The voice form does not require a prompt to identify the current speaker. Identifying a speaker the form is filled and content for display to the participants is retrieved upon receiving speech from a new speaker and the voice form is restarted to wait for another current speaker to fill the form.

The example above includes is an X+V page containing two <listener> elements that respond to the load event. The first <listener> element calls InitParticipants( ) which first executes getValidParticipants( ) querying the server for the valid participants. Next it calls updateParticipants( ) which uses dynamic HTML to build the visual list of participants and create a grammar object that will match any of the participant names uttered by the user. Comments enclosed by the elements <select id="particpants" . . . > and <one-of id="choice"> show example results of dynamically creating the content for the visual list and grammar alternatives, respectively. Finally, waitForNewCurrentSpeaker( ) is called to set up an asynchronous call back to respond to new current speaker events.

The function waitForNewCurrentSpeaker is an Ajax function that waits for a new speaker to be identified. The function object xmlhttp.onreadystatechange contained in waitForNewCurrentSpeaker in the example above is the callback function that is executed in response to satisfying the Ajax request. The response is contained in the variable xmlhttp.responseText which contains the name of the new speaker. The function calls selectParticipant with that variable as an argument to set the current speaker on the display and trigger the retrieval of content for that speaker. Finally, xmlhttp.onreadystatechange calls its parent function waitForNewCurrentSpeaker to register another Ajax call in order to respond to the next change of speaker event from the server.

The second <listener> element starts the VoiceXML form vforml in response to the load event. The VoiceXML form vforml merely listens for one of the participant names. This may be from a listening participant identifying another particular participant of interest. When matched, the <filled> element is processed which calls the function selectParticipant( ) with the recognized name passed in the variable $choice. The function selectParticipant( ) searches for the name in the visual list and then 'selects' that name by setting the property selectedIndex. Thus, uttering a name in the list has the same effect as if the user clicked on the name in the list.

The visual list element <select id="particpants" . . . > calls the function updateCurrentSpeaker( ) in response to its onchange event. This event may be triggered either by any of three means: 1) the user clicking on a name in the list, 2) the user uttering a name which is matched by the grammar in vforml, executing selectParticipant( ) or 3) by the server responding asynchronously to the Ajax function waitForNewCurrentSpeaker( ) which also ultimately calls selectParticipant( ).

The function updateCurrentSpeaker( ) uses the current selection of the visual list and calls the function updateCurrentSpeakerContent( ) This function retrieves content such as email, conference transcripts and other documents to update the content of the page for the current speaker.

Example embodiments of the present invention are described largely in the context of a fully functional computer system for multimodal teleconferencing. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of multimodal teleconferencing, the method implemented with a multimodal application and a multimodal teleconferencing module, a module of automated computing machinery operating on a server supporting a voice mode including accepting speech input from participants of the multimodal teleconference through a telephony interface, digitizing the speech, and providing digitized speech to a speech engine, the method comprising:
   receiving, by the multimodal teleconferencing module, a speech utterance from one of a plurality of participants in the multimodal teleconference;
   identifying, by the multimodal teleconferencing module, the participant making the speech utterance as a current speaker;
   retrieving, by the multimodal teleconferencing module from accounts for the current speaker, first content for display to the current speaker;
   retrieving, by the multimodal teleconferencing module from accounts for the current speaker, second content for display to one or more other participants in the multimodal teleconference, wherein at least a part of the first content is different from the second content;
   providing, by the multimodal teleconferencing module to a multimodal teleconferencing client for display to the current speaker, an identification of the speaker and the first content retrieved for the speaker;
   providing, by the multimodal teleconferencing module to one or more of multimodal teleconferencing clients for display to the other participants, an identification of the current speaker with the second content retrieved for the one or more other participants in the multimodal teleconferences;
   receiving, by the multimodal teleconferencing client of listening participant other than the current speaker, identification of another particular participant of interest;
   requesting, by the multimodal teleconferencing client from the multimodal teleconferencing module; third content of the another particular participant of interest;
   retrieving, by the multimodal teleconferencing module from accounts for the another particular participant of interest, third content of the another particular participant of interest;
   providing, by the multimodal teleconferencing module to a multimodal teleconferencing client for display to the listening participant, the third content of the another particular participant of interest; and
   displaying, by the multimodal teleconferencing client to the listening participant, the third content of the another particular participant of interest.

2. The method of claim 1 further comprising:
   receiving, by the multimodal teleconferencing module, speech from the current speaker;
   creating, by the multimodal teleconferencing module, text from the speech; and
   providing, by the multimodal teleconferencing module to the multimodal teleconferencing clients for all participants in the multimodal teleconference, the text as a transcript of the multimodal teleconference.

3. The method of claim 1 wherein identifying, by the multimodal teleconferencing module, the participant making the speech utterance as a current speaker further comprises:
receiving speech from the current speaker; and
determining whether the speech matches the voiceprint of a participant of the multimodal teleconference.

4. The method of claim 1 wherein identifying, by the multimodal teleconferencing module, the participant making the speech utterance as a current speaker further comprises:
receiving speech from the current speaker;
identifying the telephone number of the current speaker; and
determining whether the phone number of the current speaker matches a known number of a participant of the multimodal teleconference.

5. The method of claim 1, wherein receiving, by the multimodal teleconferencing client of listening participant other than the current speaker, the identification of another particular participant of interest comprises receiving, by the multimodal teleconferencing client of listening participant other than the current speaker, a speech utterance identifying the another particular participant of interest.

6. The method of claim 1, wherein receiving, by the multimodal teleconferencing client of listening participant other than the current speaker the identification of the another particular participant of interest comprises receiving, by the multimodal teleconferencing client of listening participant other than the current speaker, through a non voice mode user input device, the identification of the another particular participant of interest.

7. The method of claim 1, wherein the first content comprises at least one of confidential material and speaker notes that are defined as not to be viewed by the one or more participants that are not the current speaker.

8. An apparatus of multimodal teleconferencing, the apparatus including a multimodal application and a multimodal teleconferencing module, a module of automated computing machinery operating on a server supporting a voice mode including accepting speech input from participants of the multimodal teleconference through a telephony interface, digitizing the speech, and providing digitized speech to a speech engine, the apparatus comprising a computer memory operatively coupled to a computer processor, the memory having disposed within it computer program instructions for:
receiving, by the multimodal teleconferencing module, a speech utterance from one of a plurality of participants in the multimodal teleconference;
identifying, by the multimodal teleconferencing module, the participant making the speech utterance as a current speaker;
retrieving, by the multimodal teleconferencing module from accounts for the current speaker, first content for display to the current speaker;
retrieving, by the multimodal teleconferencing module from accounts for the current speaker, second content for display to one or more other participants in the multimodal teleconference, wherein at least a part of the first content is different from the second content;
providing, by the multimodal teleconferencing module to a multimodal teleconferencing client for display to the current speaker, an identification of the speaker and the first content retrieved for the speaker;
providing, by the multimodal teleconferencing module to one or more of multimodal teleconferencing clients for display to the other participants, an identification of the current speaker with the second content retrieved for the one or more other participants in the multimodal teleconferences;
receiving, by the multimodal teleconferencing client of listening participant other than the current speaker, identification of another particular participant of interest;
requesting, by the multimodal teleconferencing client from the multimodal teleconferencing module; third content of the another particular participant of interest;
retrieving, by the multimodal teleconferencing module from accounts for the another particular participant of interest, third content of the another particular participant of interest;
providing, by the multimodal teleconferencing module to a multimodal teleconferencing client for display to the listening participant, the third content of the another particular participant of interest; and
displaying, by the multimodal teleconferencing client to the listening participant, the third content of the another particular participant of interest.

9. The apparatus of claim 8 wherein the computer memory also has disposed within it computer program instructions for:
receiving, by the multimodal teleconferencing module, speech from the current speaker;
creating, by the multimodal teleconferencing module, text from the speech; and
providing, by the multimodal teleconferencing module to the multimodal teleconferencing clients for all participants in the multimodal teleconference, the text as a transcript of the multimodal teleconference.

10. The apparatus of claim 8 wherein computer program instructions for identifying, by the multimodal teleconferencing module, the participant making the speech utterance as a current speaker further comprise computer program instructions for:
receiving speech from the current speaker; and
determining whether the speech matches the voiceprint of a participant of the multimodal teleconference.

11. The apparatus of claim 8 wherein computer program instructions for identifying, by the multimodal teleconferencing module, the participant making the speech utterance as a current speaker further comprise computer program instructions for:
receiving speech from the current speaker;
identifying the telephone number of the current speaker; and
determining whether the phone number of the current speaker matches a known number of a participant of the multimodal teleconference.

12. The apparatus of claim 8 wherein computer program instructions for retrieving by the multimodal teleconferencing module from accounts for the current speaker, the first content for display to the current speaker include computer program instructions for retrieving email for the current speaker concerning the multimodal teleconference, biographical information about the current speaker, and documents of the current speaker related to the multimodal teleconference.

13. The apparatus of claim 8 wherein computer program instructions for retrieving by the multimodal teleconferencing module from accounts for the current speaker, the second content for display to one or more other participants in the multimodal teleconference include computer program instructions for retrieving email for the current speaker concerning the multimodal teleconference, biographical information about the current speaker, and documents of the current speaker related to the multimodal teleconference.

14. The apparatus of claim 8, wherein the first content comprises at least one of confidential material and speaker notes that are defined as not to be viewed by the one or more participants that are not the current speaker.

15. A computer program product of multimodal teleconferencing, the computer program product including a module of automated computing machinery operating on a server supporting a voice mode including accepting speech input from participants of the multimodal teleconference through a telephony interface, digitizing the speech, and providing digitized speech to a speech engine, the computer program product disposed on a non-transitory recording medium, the computer program product comprising computer program instructions for:

receiving, by the multimodal teleconferencing module, a speech utterance from one of a plurality of participants in the multimodal teleconference;

identifying, by the multimodal teleconferencing module, the participant making the speech utterance as a current speaker;

retrieving, by the multimodal teleconferencing module from accounts for the current speaker, first content for display to the current speaker;

retrieving, by the multimodal teleconferencing module from accounts for the current speaker, second content for display to one or more other participants in the multimodal teleconference, wherein at least a part of the first content is different from the second content;

providing, by the multimodal teleconferencing module to a multimodal teleconferencing client for display to the current speaker, an identification of the speaker and the first content retrieved for the speaker;

providing, by the multimodal teleconferencing module to one or more of multimodal teleconferencing clients for display to the other participants, an identification of the current speaker with the second content retrieved for the one or more other participants in the multimodal teleconference;

receiving, by the multimodal teleconferencing client of listening participant other than the current speaker, identification of another particular participant of interest;

requesting, by the multimodal teleconferencing client from the multimodal teleconferencing module; third content of the another particular participant of interest;

retrieving, by the multimodal teleconferencing module from accounts for the another particular participant of interest, third content of the another particular participant of interest;

providing, by the multimodal teleconferencing module to a multimodal teleconferencing client for display to the listening participant, the third content of the another particular participant of interest; and displaying, by the multimodal teleconferencing client to the listening participant, the third content of the another particular participant of interest.

16. The computer program product of claim 15 wherein the computer memory also has disposed within it computer program instructions for:

receiving, by the multimodal teleconferencing module, speech from the current speaker;

creating, by the multimodal teleconferencing module, text from the speech; and providing, by the multimodal teleconferencing module to the multimodal teleconferencing clients for all participants in the multimodal teleconference, the text as a transcript of the multimodal teleconference.

17. The computer program product of claim 15 wherein computer program instructions for identifying, by the multimodal teleconferencing module, the participant making the speech utterance as a current speaker further comprise computer program instructions for:

receiving speech from the current speaker; and determining whether the speech matches the voiceprint of a participant of the multimodal teleconference.

18. The computer program product of claim 15 wherein computer program instructions for identifying, by the multimodal teleconferencing module, the participant making the speech utterance as a current speaker further comprise computer program instructions for:

receiving speech from the current speaker;

identifying the telephone number of the current speaker; and determining whether the phone number of the current speaker matches known number of a participant of the multimodal teleconference.

19. The computer program product of claim 15 wherein computer program instructions for retrieving by the multimodal teleconferencing module from accounts for the current speaker, the first content for display to the current speaker include computer program instructions for retrieving email for the current speaker concerning the multimodal teleconference, biographical information about the current speaker, and documents of the current speaker related to the multimodal teleconference.

20. The computer program product of claim 15 wherein computer program instructions for retrieving by the multimodal teleconferencing module from accounts for the current speaker, the second content for display to one or more other participants in the multimodal teleconference include computer program instructions for retrieving email for the current speaker concerning the multimodal teleconference, biographical information about the current speaker, and documents of the current speaker related to the multimodal teleconference.

21. The computer program product of claim 15, wherein the first content comprises at least one of confidential material and speaker notes that are defined as not to be viewed by the one or more participants that are not the current speaker.

* * * * *